(12) United States Patent
Holt et al.

(10) Patent No.: US 8,392,957 B2
(45) Date of Patent: Mar. 5, 2013

(54) AUTOMATIC CONTENT TAGGING, SUCH AS TAGGING DIGITAL IMAGES VIA A WIRELESS CELLULAR NETWORK USING METADATA AND FACIAL RECOGNITION

(75) Inventors: Adam Holt, London (GB); Winston Wang, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 495 days.

(21) Appl. No.: 12/434,583

(22) Filed: May 1, 2009

(65) Prior Publication Data

US 2010/0277611 A1    Nov. 4, 2010

(51) Int. Cl.
*H04N 7/173* (2006.01)

(52) U.S. Cl. .............. 725/105; 348/231.3; 348/231.5; 348/207.99; 455/456.1; 455/456.3; 709/219

(58) Field of Classification Search ........... 348/231.5, 348/231.3, 207.99; 709/217–219; 455/456.1, 455/456.3

See application file for complete search history.

(56) References Cited

U.S. PATENT DOCUMENTS

| | | | |
|---|---|---|---|
| 5,740,538 A | 4/1998 | Joyce et al. | |
| 6,141,570 A * | 10/2000 | O'Neill et al. | 455/574 |
| 6,295,528 B1 | 9/2001 | Marcus et al. | |
| 6,400,956 B1 | 6/2002 | Richton | |
| 6,647,257 B2 | 11/2003 | Owensby | |
| 6,836,730 B2 | 12/2004 | Root et al. | |
| 6,845,324 B2 | 1/2005 | Smith | |
| 7,058,433 B2 | 6/2006 | Carpenter | |
| 7,096,038 B1 | 8/2006 | Perrella | |
| 7,340,275 B2 | 3/2008 | Hamamura | |
| 7,433,710 B2 | 10/2008 | Bodnar et al. | |
| 7,515,175 B2 | 4/2009 | Tanaka et al. | |
| 7,663,671 B2 | 2/2010 | Gallagher et al. | |
| 2002/0067308 A1 | 6/2002 | Robertson | |
| 2003/0004743 A1 | 1/2003 | Callegari | |
| 2003/0157960 A1 | 8/2003 | Kennedy | |
| 2003/0202104 A1 | 10/2003 | Werner | |
| 2004/0066419 A1 | 4/2004 | Pyhalammi | |
| 2004/0076279 A1 | 4/2004 | Taschereau | |
| 2004/0083275 A1 | 4/2004 | Strisower | |
| 2004/0108375 A1 | 6/2004 | Maillard | |
| 2004/0192299 A1 | 9/2004 | Wilson et al. | |
| 2004/0204032 A1 | 10/2004 | Hisano et al. | |
| 2005/0096084 A1 | 5/2005 | Pohja et al. | |
| 2005/0131639 A1 | 6/2005 | Broussard et al. | |
| 2005/0227711 A1 | 10/2005 | Orwant et al. | |
| 2005/0240346 A1 | 10/2005 | Lin | |
| 2005/0275506 A1 * | 12/2005 | Otsuka | 340/5.83 |

(Continued)

FOREIGN PATENT DOCUMENTS

| | | |
|---|---|---|
| EP | 2096857 A1 | 9/2009 |
| KR | 20070089337 A | 8/2007 |

OTHER PUBLICATIONS

"Eye-Fi Card: Wireless 2GB SD Memory Card Product Packaging," Eye-Fi Inc, 2007, 8 pages.

(Continued)

*Primary Examiner* — Sinh Tran
*Assistant Examiner* — Paul Berardesca (57) ABSTRACT

Described in detail herein are systems and methods for automatically generating tags for digital content, such as digital images from a digital camera or camcorder. Further, the system can automatically determine who or what may be in digital content. Further details and features are described herein.

22 Claims, 8 Drawing Sheets

U.S. PATENT DOCUMENTS

| | | | |
|---|---|---|---|
| 2006/0089160 | A1 | 4/2006 | Othmer |
| 2006/0090079 | A1* | 4/2006 | Oh et al. ............... 713/186 |
| 2006/0142018 | A1 | 6/2006 | Matz et al. |
| 2006/0270421 | A1 | 11/2006 | Phillips et al. |
| 2007/0061133 | A1 | 3/2007 | Ohwaki |
| 2007/0073717 | A1 | 3/2007 | Ramer et al. |
| 2007/0162971 | A1* | 7/2007 | Blom et al. ............... 726/17 |
| 2007/0196075 | A1 | 8/2007 | Yanagita |
| 2007/0257934 | A1 | 11/2007 | Doermann et al. |
| 2007/0270163 | A1 | 11/2007 | Anupam et al. |
| 2008/0100718 | A1 | 5/2008 | Louks et al. |
| 2008/0102892 | A1 | 5/2008 | Louks et al. |
| 2008/0113614 | A1 | 5/2008 | Rosenblatt |
| 2008/0192129 | A1 | 8/2008 | Walker et al. |
| 2008/0194270 | A1* | 8/2008 | Greenberg ............... 455/456.1 |
| 2010/0026816 | A1 | 2/2010 | Bergstrom et al. |
| 2010/0029326 | A1 | 2/2010 | Bergstrom et al. |
| 2010/0082575 | A1* | 4/2010 | Walker et al. ............... 707/706 |

OTHER PUBLICATIONS

"GeoRSS," Wikipedia, http://en.wikipedia.org/wiki/GeoRSS [Last Accessed Apr. 26, 2010], 4 pages.

"GeoRSS: Geographically Encoded Objects for RSS feeds," http://georss.org [Last Accessed Apr. 26, 2010], 2 pages.

"Google Maps Help Center," Google Maps, http://maps.google.com/support/bin/answer.py?hI=en&answer=68480 [Last Accessed Apr. 26, 2010], 8 pages.

"I Am Here: One Man's Experiment with the Location-Aware Lifestyle," Wired Magazine, http://www.wired.com/gadgets/wireless/magazine/17-02/Ip_guineapig?currentPage=all [Last Accessed Apr. 26, 2010], 7 pages.

"SDIO Card Definition," PC.MAG.COM Encyclopedia, The Computer Language Company Inc., http://www.pcmag.com/encyclopedia_term/0,2542,t=SDIO+card&i=50973,00asp [Last Accessed Apr. 9, 2008], 1 page.

"SKYHOOK Wireless: How It Works," Skyhook Wireless, Inc., http://www.skyhookwireless.com/howitworks/ [Last Accessed: Apr. 26, 2010], 7 pages.

"What is Slam?", SLAM, http://www.msslam.com/About.aspx [Last Accessed Apr. 26, 2010], 4 pages.

Charles, Dan, "GPS is Smartening Up Your Cell Phone," NPR, http://www.npr.org/templates/story/story.php?storyId=6097216 [Last Accessed Apr. 26, 2010], 4 pages.

Jaffe, Alexander et al., "Generating Summaries and Visualization for Large Collections of Geo-Referenced Photographs," MIR '06, Oct. 26-27, 2006, Santa Barbara, California, USA, 10 pages.

Mologogo, http://www.mologogo.com [Last Accessed Apr. 26, 2010], 3 pages.

Reardon, Marguerite, "Verizon Wireless adds friend-finding service," CNET Reviews, http://reviews.cnet.com/8300-12261_7-51.html?keyword=GPS [Last Accessed May 20, 2008], 1 page.

Sorrel, Charlie, "IPhone 2.0 to Incorporate Photo Geotagging," Wired Network, http://blog.wired.com/gadgets/2008/05/iphone-20-to-in.html [Last Accessed Apr. 26, 2010], 7 pages.

International Search Report and Written Opinion for PCT/US2010/033279, Filed on Apr. 30, 2010, Applicant: T-Mobile USA, Inc., Mailed on Dec. 28, 2010, 9 pages.

* cited by examiner

AUTOMATIC CONTENT TAGGING, SUCH AS TAGGING DIGITAL IMAGES VIA A WIRELESS CELLULAR NETWORK USING METADATA AND FACIAL RECOGNITION

BACKGROUND

Digital image capture devices, such as digital cameras or camera phones, are ubiquitous. However, billions of digital photographs are "trapped" each year on cameras or personal computers as consumers struggle to share those photos with others. Some web sites have become available to allow users to share their photos, such as Flickr, Picasa, Kodak Gallery, and so forth. These sites, however, require a user to take a set of photos, download them to a personal computer, upload them to a photo-sharing web site, and then provide a notification (such as an email) and authorization for third parties to access and view those photos.

Backwards compatible Secured Digital Input/Output cards (SDIO cards) are now available to help in the photo-sharing process. For example, the Eye-Fi card is an SDIO card that includes semiconductor memory and an IEEE802.11 radio. The card may be inserted into a camera, where images taken by the camera are stored on the card. The radio on the card then allows the user to wirelessly transmit these images to a user's personal computer or web site.

One problem with such a card is that it may be difficult to implement, particularly for users very inexperienced with computers or digital equipment. Further, a user must ensure that her digital camera can accept a particular memory card. Moreover, the user must have a personal computer and be sufficiently knowledgeable in use of that computer in order to use the card. Thus, the ability to serve a variety of people or equipment, tag images, or otherwise manage images is needed.

Another problem is that users often wish to "tag" their images or associate images with certain metadata. It has become popular to store media such as digital images on the web together with user-generated metadata that aid in their discoverability. This metadata, commonly referred to as 'tags', can represent aspects that classify the media by arbitrary representations (e.g. rain, yellow, mountain, Seattle) or serve to record the identities of those present in the media. In the case of images, this can help in pinpointing the area of the image in which the named person is present. Such metadata or tags can help the user organize or locate images, or to share images with others. Further, such metadata can be used by third parties, such as for targeting advertising. Diligent tagging of media within a social web context creates significant benefits for the community as a whole, greatly enhances media discoverability, and provides the capability to share media and cluster related content.

Drawback is that the process of tagging is labor intensive and inaccurate, with the responsibility lying either solely with the person who uploaded the media or distributed across a broader part of the online community. Moreover many instances of visual media (photos and movies) contain only a partially tagged set of the people or objects present in the frame due to the inability or unwillingness of the person who uploaded the media, and the community that has reviewed it, to identify all persons or objects present. This is particularly true of large group shots or shots containing passersby.

The need exists for a system that overcomes the above problems, as well as one that provides additional benefits. Overall, the examples herein of some prior or related systems and their associated limitations are intended to be illustrative and not exclusive. Other limitations of existing or prior systems will become apparent to those of skill in the art upon reading the following Detailed Description.

The headings provided herein are for convenience only and do not necessarily affect the scope or meaning of the claimed invention.

In the drawings, the same reference numbers and any acronyms identify elements or acts with the same or similar structure or functionality for ease of understanding and convenience. To easily identify the discussion of any particular element or act, the most significant digit or digits in a reference number refer to the Figure number in which that element is first introduced (e.g., element 204 is first introduced and discussed with respect to FIG. 2).

DETAILED DESCRIPTION

A system described below contains a media capture device such as a digital camera, a series of tracking devices such as cell phones, and a connected infrastructure that includes an application or web server and an online media store. The camera and/or phone contains a location-determining device such as a GPS or GIS unit, a digital compass and the ability to store metadata for each media item it generates. That metadata includes the GPS coordinates, compass readings, the camera and lens settings from which the field of view can be determined, a timestamp, and/or details of known margins of error/tolerances for all stored measurements. (In the case of capturing movies, the camera may record a sequence of changes to any of the measurements observed throughout the duration of the movie.) The camera transfers the media and metadata to an online or web server, at the point it is next synchronized with a PC (utilizing a PC client application), via an embedded client in the camera that utilizes a wireless network (e.g. WiFi, Bluetooth or a cellular network such as UMTS), or by other means. The camera may, from time-to-time, synchronize its internal clock with a centralized or network server time source (e.g., when connected to the network to upload media). The camera may employ a power-management capability that can keep the camera in a pseudo-on or standby state after it is switched-off if it still needs to get an accurate GPS fix in order to precisely locate itself.

The tracking devices create a record of their location over time. This may be recorded as a table of entries with each row containing a timestamp, the GPS coordinates, and any known margin of error for the GPS reading. A new row is created for each observable change in GPS coordinates or periodically (e.g. every 1-5 minutes). The table can be tuned to reduce the number of entries (e.g., only record a change of more than 50 meters from the last entry). The tracking devices can be implemented as a software client application on a mobile phone containing a GPS receiver or be a part of the camera noted above. A location server, forming part of a wireless network, may track each device and create the table of locations with timestamps, and store the table in a database for later queries. Alternatively or additionally, the device itself may upload location information periodically to a location server. This can be achieved wirelessly via a WiFi, Bluetooth or cellular network, or by periodically or sporadically connecting the device via USB to a PC containing client software that will get the timestamp from the server via the PC's Internet connection and upload location data, such as in the form of a table.

The application/web server maintains a database of user devices that exist in the system. When a camera/phone uploads new media, the application server extracts the metadata and calculates a meaningful geographical area that has been captured ('meaningful' here may be defined as a zone in which objects are in reasonable focus). The server then correlates this with the device location table and looks for any vectors (location and timestamp) that fall within the meaningful geographical area at the time the media was captured.

The application server may notify device users when it detects the presence of their devices in or associated with any uploaded media. Each user is then able to connect to the application server via a web interface and review the detected association. They can confirm or deny if they were actually present in the media (since due to error margins on measurements taken there is a probability that they were just outside the field of view, or they could be inside the field of view but obscured by a foreground object). They may also wish to remove any association due to privacy reasons.

The system may employ face recognition to identify faces stored in a database from a photo. A level of uncertainty in the match exists and grows as the database of possible faces grows, and thus so grows the more nondeterministic the match. The system described herein can assist the process of face recognition by eliminating a majority of faces held in the database and working from a much smaller set of possible matches.

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

System Description

Figure 1:
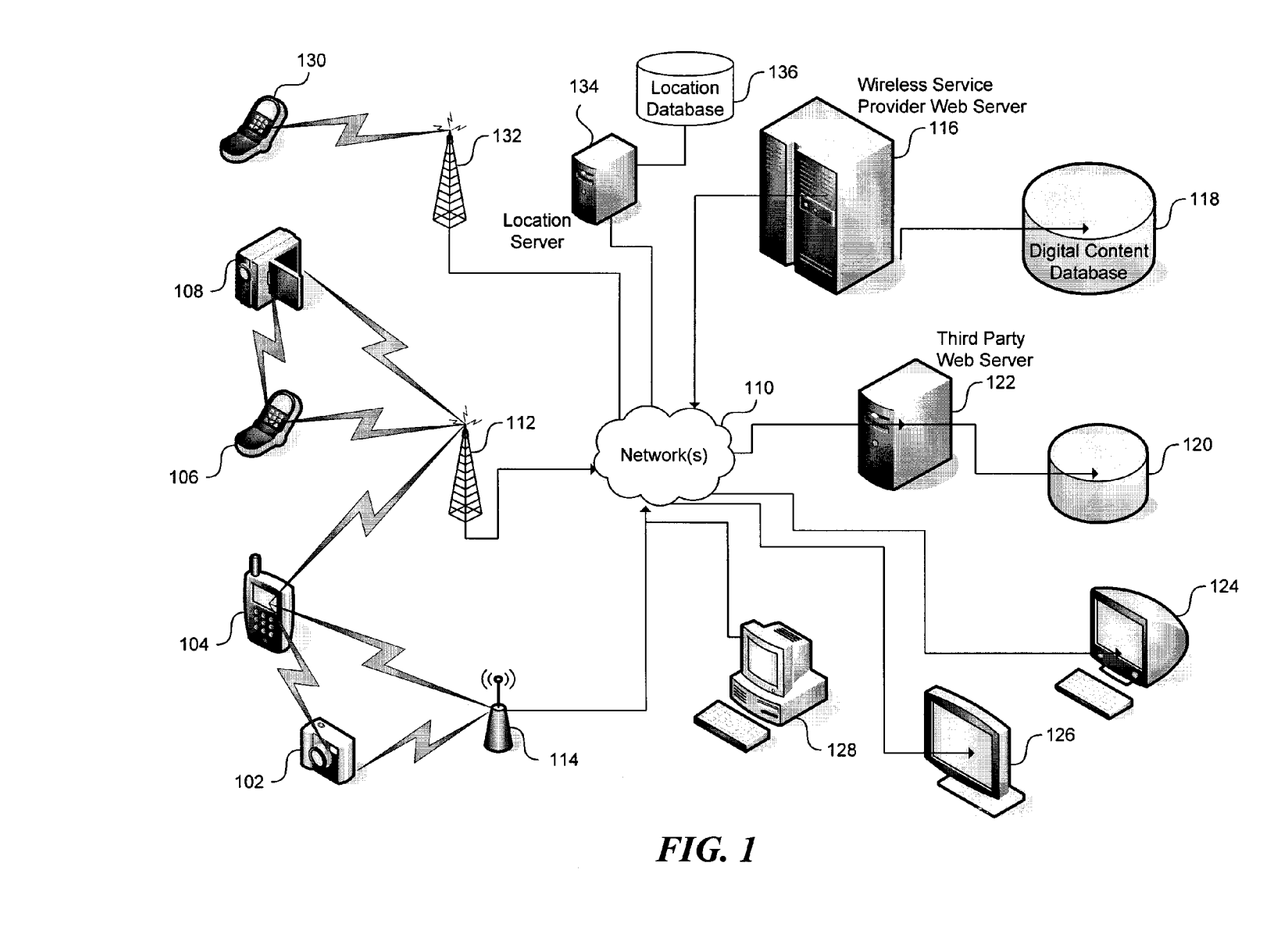
FIG. 1 is a system diagram illustrating a suitable system for implementing aspects of the invention.

FIG. 1 and the following discussion provide a brief, general description of a suitable environment in which the invention can be implemented. Although not required, aspects of the invention may be described below in the general context of computer-executable instructions, such as routines executed by a general-purpose data processing device, e.g., a server computer or personal computer. Those skilled in the relevant art will appreciate that the invention can be practiced with other communications, data processing, or computer system configurations, including: wireless devices, Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "server," and the like are generally used interchangeably herein, and refer to any of the above devices and systems, as well as any data processor.

While aspects of the invention, such as certain functions, are described as being performed exclusively on a single device, the invention can also be practiced in distributed environments where functions or modules are shared among disparate processing devices, which are linked through a communications network, such as a Local Area Network (LAN), Wide Area Network (WAN), or the Internet. In a distributed computing environment, program modules may be located in both local and remote memory storage devices.

Aspects of the invention may be stored or distributed on tangible computer-readable media, including magnetically or optically readable computer discs, hard-wired or preprogrammed chips (e.g., EEPROM semiconductor chips), nano-technology memory, biological memory, or other data storage media. Alternatively, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

As shown in FIG. 1, a digital camera 102 may be wirelessly connected to a mobile device 104, such as a cellular phone or smartphone. Likewise, a phone 106 may be wirelessly connected to a video camera or other video-capture device 108. The phones 104, 106 in turn may wirelessly communicate with a network 110 via one or more cellular transceivers 112 within a cellular telephone network or other wireless network. Alternatively, or additionally, the digital camera 102 and/or video capture device 108 may communicate wirelessly and directly with the network 110. The cellular telephone network may operate at any known standard, such as GSM, CDMA, etc. While the term "phone" is used herein, any wireless mobile device capable of performing the functions described herein may be used.

Alternatively or additionally, a cell phone or camera, such as phone 104 or camera 102 may communicate with the network 110 via a wireless local area network (WLAN), via a wireless access point (AP) or hotspot 114. The wireless AP 114 may use any known wireless communication protocols, such as IEEE 802.11. The phone 104 can communicate with the network via the AP 114 via the Unlicensed Mobile Access (UMA) or the Generic Access network (GAN) protocol. The AP 114 typically has a wireless range that is less than that of cellular transceiver 112.

As explained in more detail below, while pictures or videos provided by cameras 102, 108 may be wirelessly sent to the network 110 directly, they may also be sent to the network via phones 104, 106, where such phones effectively act as modems to pass through the digital images. The network 110 in turn routes the images to a pre-determined location, such as one determined from a Universal Resource Locator (URL). For example, the network may route the images to a web server 116 determined by the user's wireless service provider. The web server 116 in turn stores those images in a database 118, as described below. Likewise, the images may be stored directly in a third-party database 120 associated with a third-party web server 122, or be rerouted to database 120 by web server 116. Further details on an image generating and routing system may be found in the assignee's U.S. patent application Ser. Nos. 12/182,942 and 12/182,952, both filed Jul. 30, 2008, entitled "Wireless Data Capture and Sharing System, such as Image Capture and Sharing of Digital Camera Images via a Wireless Cellular Network" and "Wireless Data Capture and Sharing System, such as Image Capture, and Sharing of Digital Camera Images via a Wireless Cellular Network and Related Tagging of Images", all respectively The user may access the images stored in databases 118 or 120 via a personal computer 124. Alternatively or additionally, the camera 102, 108 may lack any wireless capability and the user may instead upload images from the camera to the personal computer 124, or to the database 118 or 120, via that personal computer. This can be achieved periodically or sporadically via a WiFi, Bluetooth or other wireless link, or by connecting the device via USB or other wired link to the personal computer 124. Thus, while digital content transfer is described at times herein as using a wireless connection, such as through the phone 104, any communications interface or connection between a digital content capture device (e.g. camera 102) and the network 110 may be used to transfer content, including any of the wireless and wired connections noted herein, as well as others.

The computer 124 may contain client software that will not only route the images to the database 118 or 120 via an Internet connection, but may also get a timestamp from a network-accessible server to synchronize a clock in the camera 102, 108 and/or personal computer 124. Any uploaded images may be displayed on an electronic picture frame 126 or a similar display device, or be accessed by a third party on a third-party computer 128 (typically when first authorized by the user). Likewise, the images may be displayed on a third-party mobile device 130, which may be on a different cellular network 132.

As described below, the wireless service provider tracks the location of wireless devices, such as phones 104, 106 and 130, using known technologies, such as GPS, GIS or location-determined technology employing the cellular transceiver 112, AP 117, and/or other different cellular network 132 via a location server 134 and location database 136 coupled to the network 110. As a background service, each device may periodically report its GPS coordinates to the wireless network (e.g. via cellular transceiver 112). Alternatively or additionally, the cellular transceiver 112 may, with assistance from the wireless device, employ know signal triangulation and/or signal delay techniques to determine a location of each wireless device. As described in more detail below, the location server 134, together with location database 136, can provide location data associated with the location of the mobile devices 104, 106, and/or 130, and/or cameras 102 and 108. The location server 134 creates a record of the location of each device over time. This may be recorded as a table of entries in the location database, with each row containing a user name and/or electronic identifier for the device, the GPS coordinates, a timestamp, and may include any known margin of error for the GPS reading.

Alternatively or additionally, the wireless devices themselves may locally store their periodically obtained location data and upload it to the location server 134. The wireless devices can implement a software client application on the device that periodically obtains location data from a local GPS receiver. The locally stored location data can then be uploaded wirelessly via a WiFi, Bluetooth or cellular network, or by periodically or sporadically connecting the device via USB to the personal computer 124. The computer 124, then in turn, provides the location data to the location server 134.

As described in more detail below, the system automatically gathers metadata and associates tags with digital media such as photos. Upon receiving the photos, the system can query the user or third parties whether to add the tags to the photos. While described generally below as receiving images at the mobile phone 104 and providing a query to the user at that phone, the servers 116 or 122 can provide the user with such a query at the user computer 124. With the images stored in one or more databases 118 or 120, with their associated tags, the servers then may make use of those tags, such as permitting the user to organize photos by tags, create photo albums to be printed, share photos with others, and so forth. Such tags could also be used to provide targeted advertising to the user or others.

Phone and Camera

Figure 2:
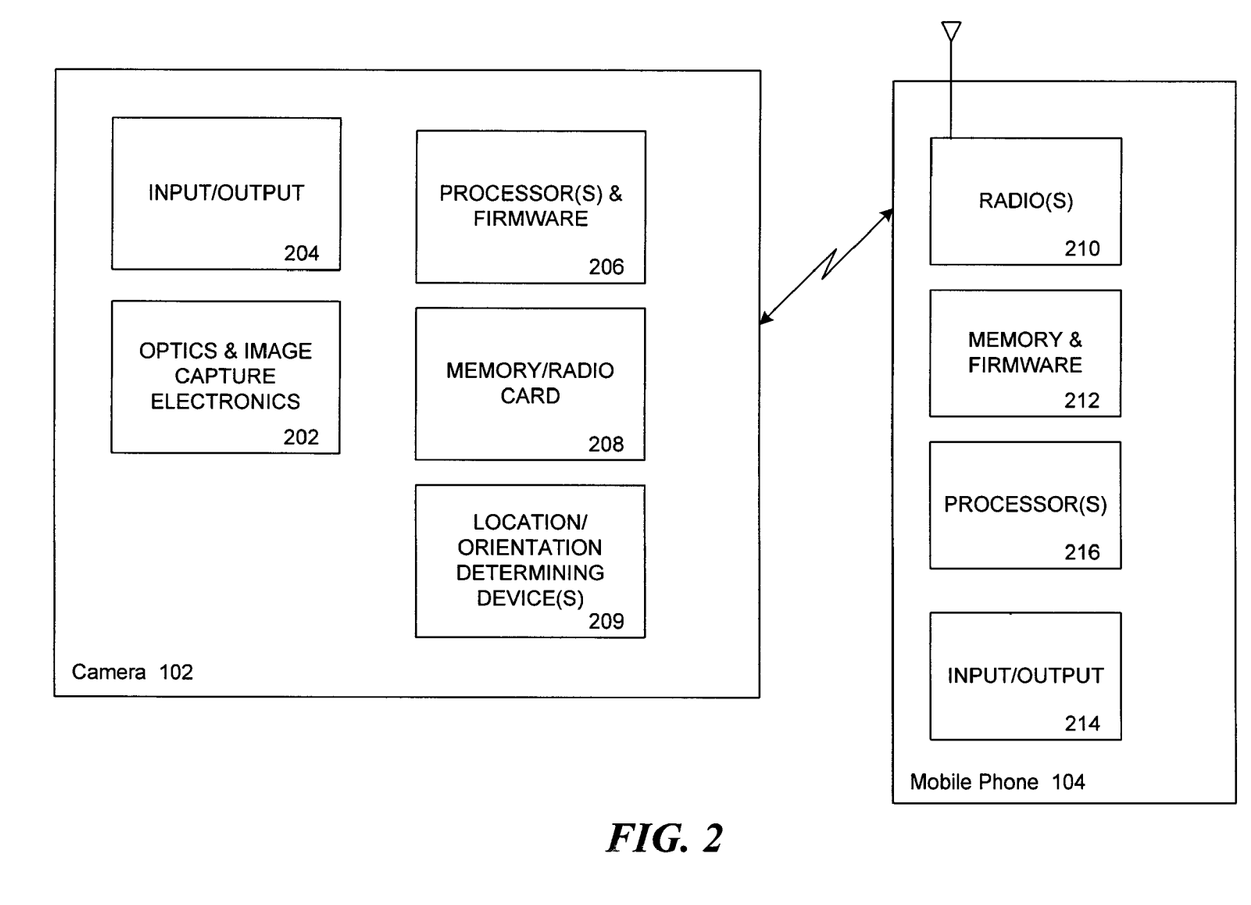
FIG. 2 is a block diagram illustrating a camera wirelessly linked with a mobile phone.

Referring to FIG. 2, the camera 102 may be a digital camera that includes optics and image capture electronics 202 and input/output components 204, all connected to communicate with one or more processors operating firmware 206. The input/output components may include various buttons or user controls, one or more display screens, audio input and/or output devices (e.g. microphone/speaker), etc. As described more fully below, the camera may also include a removable memory card that includes a wireless radio 208. (Of course, the camera may instead include a fixed wireless radio and/or fixed memory.) The removable memory card is received within a card slot of the camera, and can be of a form and shape common to any known cards, such as SD cards, xD cards, PCMCIA cards, etc. Further, the camera may include other memory, such as an image buffer for at least temporarily storing images.

Figure 8:
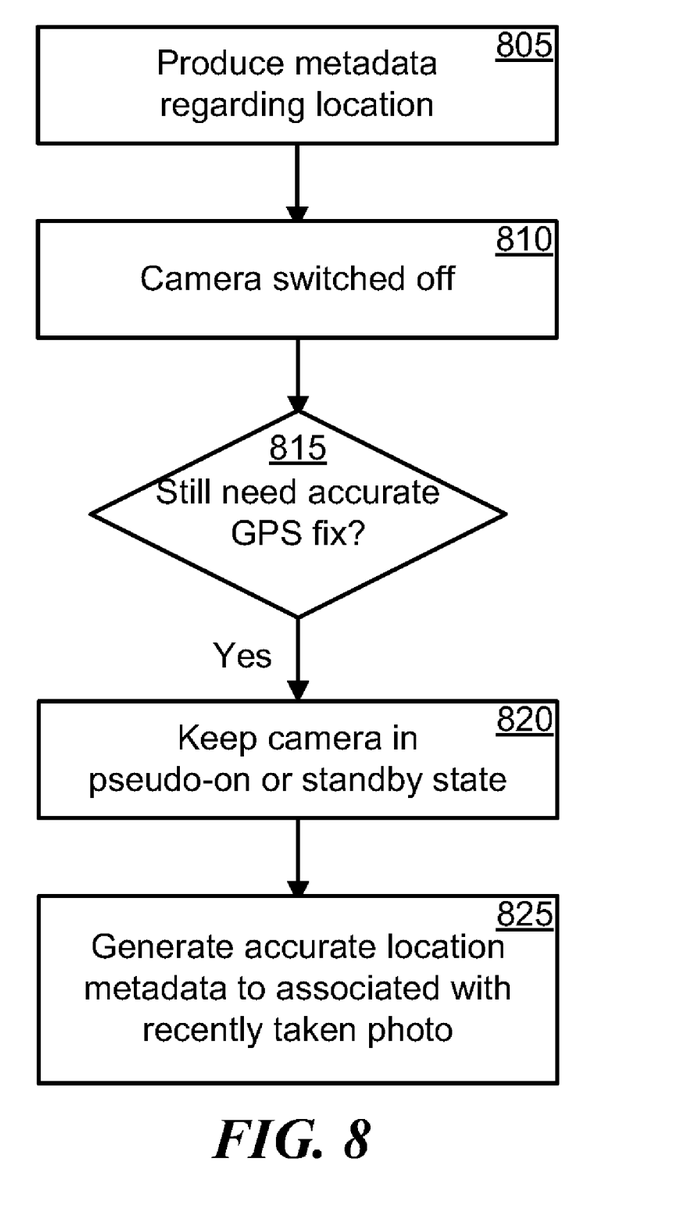
FIG. 8 is a flow chart showing an example of a process for obtaining location data by the camera.

The camera 102 also includes a location/orientation determining device(s) 209, which can include a digital compass, GPS/GIS receiver, and/or other components to determine the geographic location of the camera (latitude and longitude), and an orientation or direction in which a field of view of the camera is directed. The location/orientation determining device(s) 209 produce metadata regarding location (FIG. 8, block 805) and orientation for uses described below. The camera may also employ a power-management capability that can keep the camera in a pseudo-on or standby state (FIG. 8, block 820) after it is switched-off (FIG. 8, block 810) if it still needs to get an accurate GPS fix (FIG. 8, block 815) in order to precisely locate itself and generate accurate location metadata to associate with a recently taken photo (FIG. 8, block 825). Likewise, the optics and image capture electronics 202 generate metadata regarding a focal length at which the optics or camera is set, and the processor or clock (not shown) can determine a time at which the image is taken, all for use as described below. Such metadata may be taken, e.g. from Exchangeable Image File Format (EXIF) data embedded in many digital images, e.g. JPEG images.

The camera 102 can wirelessly communicate with a mobile phone, such as phone 104, which includes one or more radios 210, memory and firmware 212 and input/output components 214 that all communicate with one or more processors 216. The radios can include a GSM radio, as well as a WLAN, and/or personal area network (PAN) radio, such as one employing IEEE 802.11, Bluetooth or other wireless standards. In the example of FIGS. 1 and 2, the camera and phone communicate with each other over a short-range wireless link using any known short-range protocol. Such short-range protocol typically has a range of about 10-50 meters (often under 100 meters), and includes Piconet protocols, including Zig-Bee, IrDA, and Ultra Wide Band (UWB).

The processors in the phone, camera or both can include other components for processing images, facilitating voice and data calls, as well as processors for performing actions described herein. Indeed, as an alternative, or in addition to the processor(s), the camera/phone may include one or more digital signal processors (DSPs), application-specific integrated circuits (ASICs), field programmable gate arrays (FPGAs), or other logic/data processing circuitry. The input/output components of the phone 104 include a microphone, speaker, visual display, user input buttons, as well as other components, such as a global positioning system (GPS), a digital camera, and so forth. While the phone 104 may have its own digital camera, the camera 102 is typically designed specifically for taking higher quality digital images, and thus may have a much higher resolution digital imager, better optics, and so forth. Both the phone 104 and the camera 102 may include a removable card slot to receive a Subscriber Identity Module (SIM) as well as a removable memory card that may itself include a radio, as noted herein.

Representative Image Transfer Process

Figure 3:
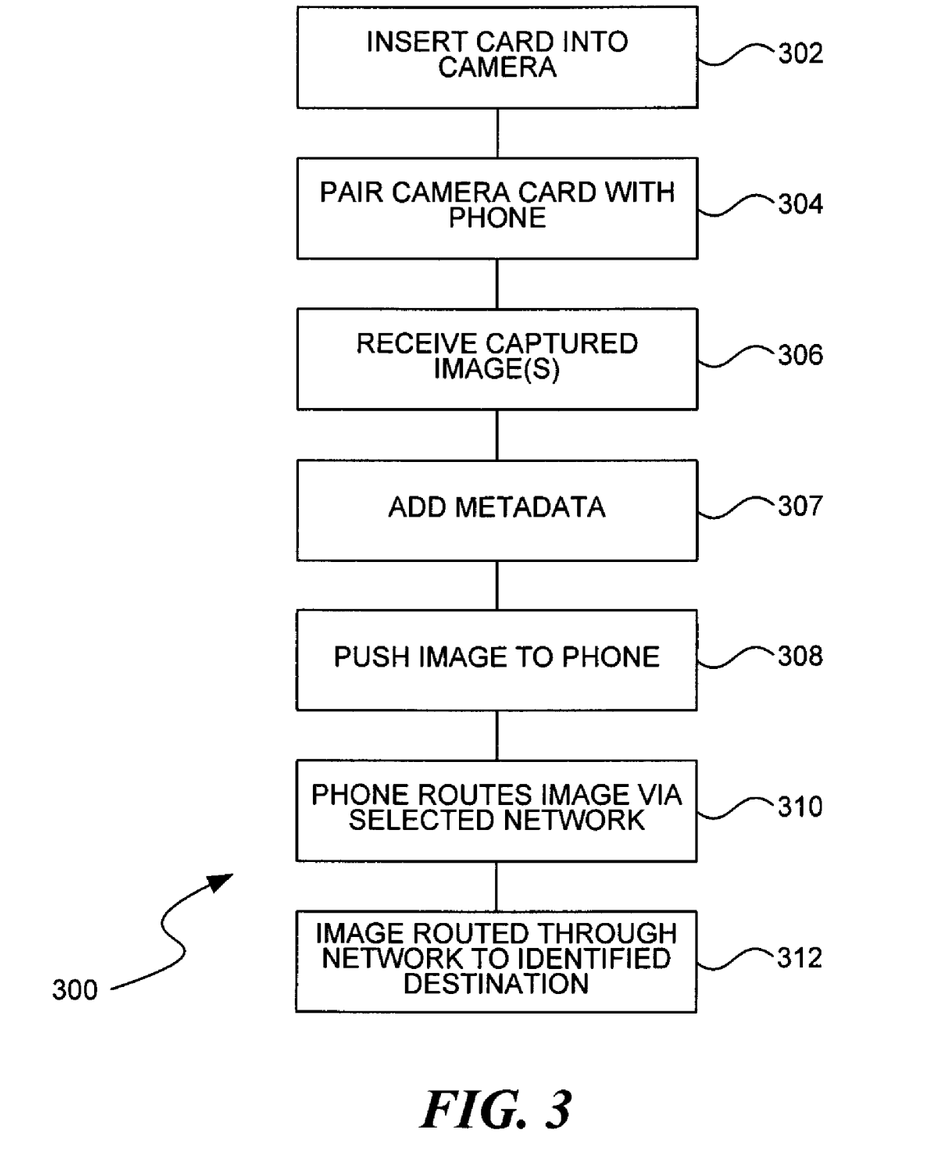
FIG. 3 is a flow diagram illustrating a process for wirelessly routing images from a camera, through the mobile phone, to a network location.

Referring to FIG. 3, a routine 300 performed by the system in FIG. 1 depicts one of multiple ways to transfer an image from the camera 102 to the network, although many other methods for transferring images may be employed, as noted herein. The routine 300 begins by initially inserting a card having a radio into the camera 102 if the camera lacks a wireless link (block 302). The phone 104 then pairs itself with the camera 102, such as using standard Bluetooth pairing. Indeed, the camera and phone may use any of various Bluetooth profiles, such as the Dial-Up Networking (DUN) or Personal Area Network (PAN) profiles. As a result, the camera and phone are thereafter paired or linked so that secure communications may be exchanged between the two (block 304).

More importantly, the camera, using firmware stored in the camera or within the removable memory/radio card 208, can automatically add metadata to digital pictures and route them from the camera to the network and elsewhere via the phone 104. Thus, after receiving a captured image (block 306), the camera adds metadata (block 307) and, via its radio, transmits the image to the phone 104 (block 308). The added metadata includes the geographic location of the camera, its orientation, the focal length set for the optics, the time the image was taken, and/or other metadata described herein. The phone and/or the camera encapsulates the image and metadata with network routing information or address. For example, the camera (or phone) may add a header to the digital image to route the image to the user's personalized photo album at an Internet site or URL. Thus, the header can take the form of, for example, "http://www.T-Mobile.com/My Album [user ID]." The user ID may include any unique identifier for the user, such as the user's mobile identification number (MIN), International Mobile Subscriber Identifier (IMSI), International Mobile Equipment Identifier (IMEI), Secret Serial Number (SSN), phone number, Medium Access Control (MAC) address, Globally Unique Identifier (GUID), or any other identifier.

Firmware in the radio card 208 of the camera 102, or in memory 212 of the phone 104 can include a preprogrammed address, as well as instructions, for transmitting the digital image. The address can be a TCP/IP address, with a place for the user, wireless service provider, or other to insert the user's specific identifier. There may also be provisioning for the user, service provider, or other to insert aspects of the address.

The phone routes the image via a selected network (block 310), which can include a cellular telephone network (like GSM), or via a local area network. The phone may select the best or preferred network based on any of a variety of criteria, such as availability, signal strength, costs, and so forth. Indeed, the system can use any type of protocol or transport mechanism, including the Wireless Application Protocol (WAP), Multimedia Message Service (MMS), HyperText, Transfer Protocol (HTTP), and so forth. Once received by the network 110, the network routes the images to the specified destination, such as to the web server 162 for storage and database 118 (block 312).

Overall, the image may be routed to any TCP/IP address or URL, which the network 110 then routes to the appropriate destination, such as web server 116. The My Album web site for the user is a media gateway to enable users to manage their photos from a central location, to obtain or purchase prints, or shop for additional media items. The web server acts as an intelligent intermediary for the digital image gateway and user manipulation of photos. As explained herein, the web server 116 may then in turn relay one or more received images to a third-party web server 122. Such third-party web servers may be any of various image storing and sharing sites, including Flickr and Picasa, or social networking sites such as Facebook. The user can then go to the one or more web sites to access and manage his or her photos, as described herein.

Further, the user can access a predefined network location (accessible via the Internet) to rename his or her photo home page (e.g., changing it from some arbitrary, but unique, numeric value, to one more personalized to the user's tastes, like "www.T-Mobile.com/MyPhotos/00124758" to "www.T-Mobile.com/MyPhotos/Chrissy's RomePictures"). Of course, the images can also be transferred or copied to another site, even to the user's home computer. Further, as noted below, when the user accesses her pictures at her photo home page, the server 116 may query her whether to add or associate automatically obtained descriptive data, metadata or tags with newly added photos.

Radio-Memory Card

Figure 4:
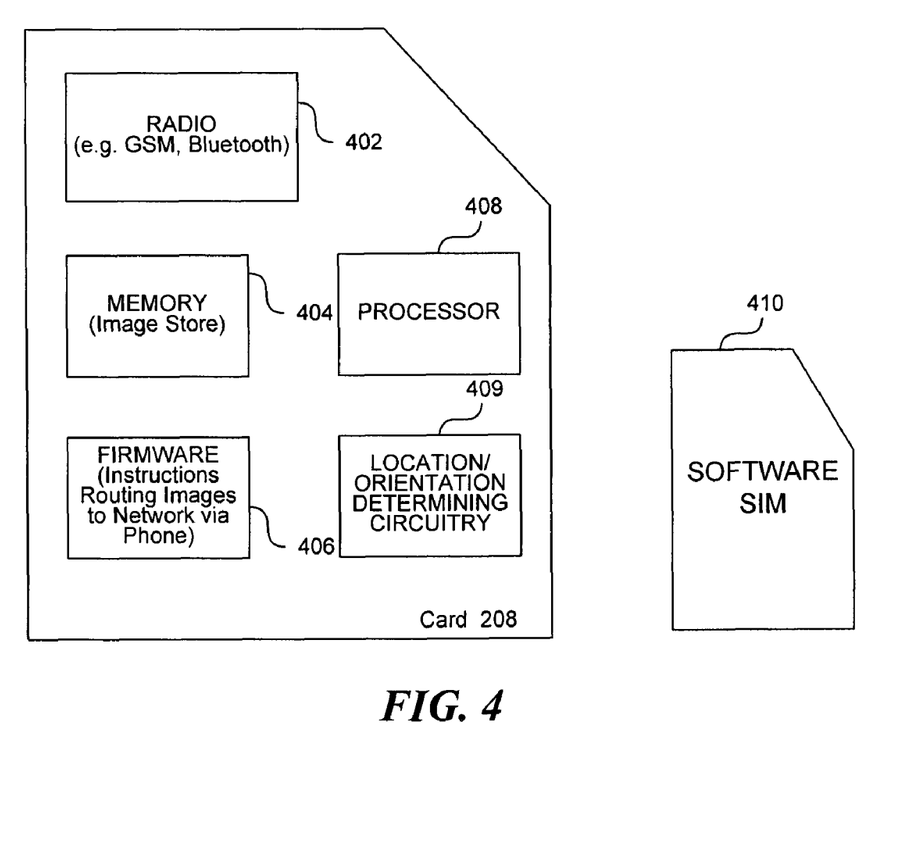
FIG. 4 is a block diagram illustrating a memory card with wireless capabilities and associated software.

Referring to FIG. 4, the card 208 in the camera 102 includes a radio or wireless transceiver 402, semiconductor memory 404 and firmware 406, all carried or secured to some substantially rigid substrate or other member. As noted above, the radio can be of any form, but in this example is a Bluetooth radio. Alternatively or additionally, the radio can be configured to operate using other protocols, including more powerful protocols such as GSM or CDMA. If so, the camera 102 may include, either stored in the memory 404 or elsewhere on the camera, a hardware or software SIM to permit communications over the GSM network. The camera thus acts like a phone on the network, even if it is not configured for voice communications, and can thus forward photos directly to the network 110 and server 116. The camera nevertheless can provide for real time communications, including photo-sharing, as described herein.

The memory 404 can be any semiconductor memory to permit the storing of photos. Notably, this memory need not be as large as is typical with digital camera memory, because the camera need not store images locally. Instead, with the wireless link, the camera can store photos elsewhere, such as in databases 118 or 120. The memory 404 may also include, or act as, an image buffer for at least temporarily storing captured images.

The firmware 406 includes instructions performed by processor 408 to permit the camera to automatically and wirelessly send photos. When the card 208 is inserted in the camera, the camera simply recognizes it as a memory card. However, whenever images are stored in the memory 404, the processor, operating on instructions stored in the firmware 406, transfers images from the memory to the phone 104 when the phone is paired to and within range of the camera 102. As noted above, the firmware includes an address that the processor includes with each image so that the image is routed appropriately via the network 110. The firmware may also include instructions to gather any relevant metadata to be associated with the images, such as timestamps, location data (e.g. from a GPS receiver), field of view, focal length, orientation, environmental data, etc.

Optionally, the card 208 may include location/orientation determining circuitry 409, similar to the location/orientation determining device(s) 209 noted above. Thus, the card 208 may include a GPS receiver, digital compass, and the like. The camera 102 can be affectively upgraded to include not only the radio 402, but also location/orientation determining circuitry 409. Further, the camera has a clock to timestamp photos with metadata indicating when a photo was taken. With a wireless receiver, such as the GPS receiver or radio, the camera can synchronize its clock with an accurate satellite or network clock to help ensure that the timestamp added to photos is accurate.

Representative Processes for Tagging Digital Content

As noted above, the system can associate descriptive data or metadata with captured digital content. For example, the digital camera 102 or camcorder 108 may capture digital content and forward it directly to the network or to the mobile phone 104, 106, and the camera/camcorder or phone may automatically add metadata or tag the digital content with descriptive data. In general, the terms "tag," "metadata" and related terms refer to any data that relates to digital content or media (still images, video, audio, etc.). For example, the tags may indicate the names of individuals in pictures, the name of an event when a video was taken, or the name of a location where a digital audio clip was captured.

Figure 5:
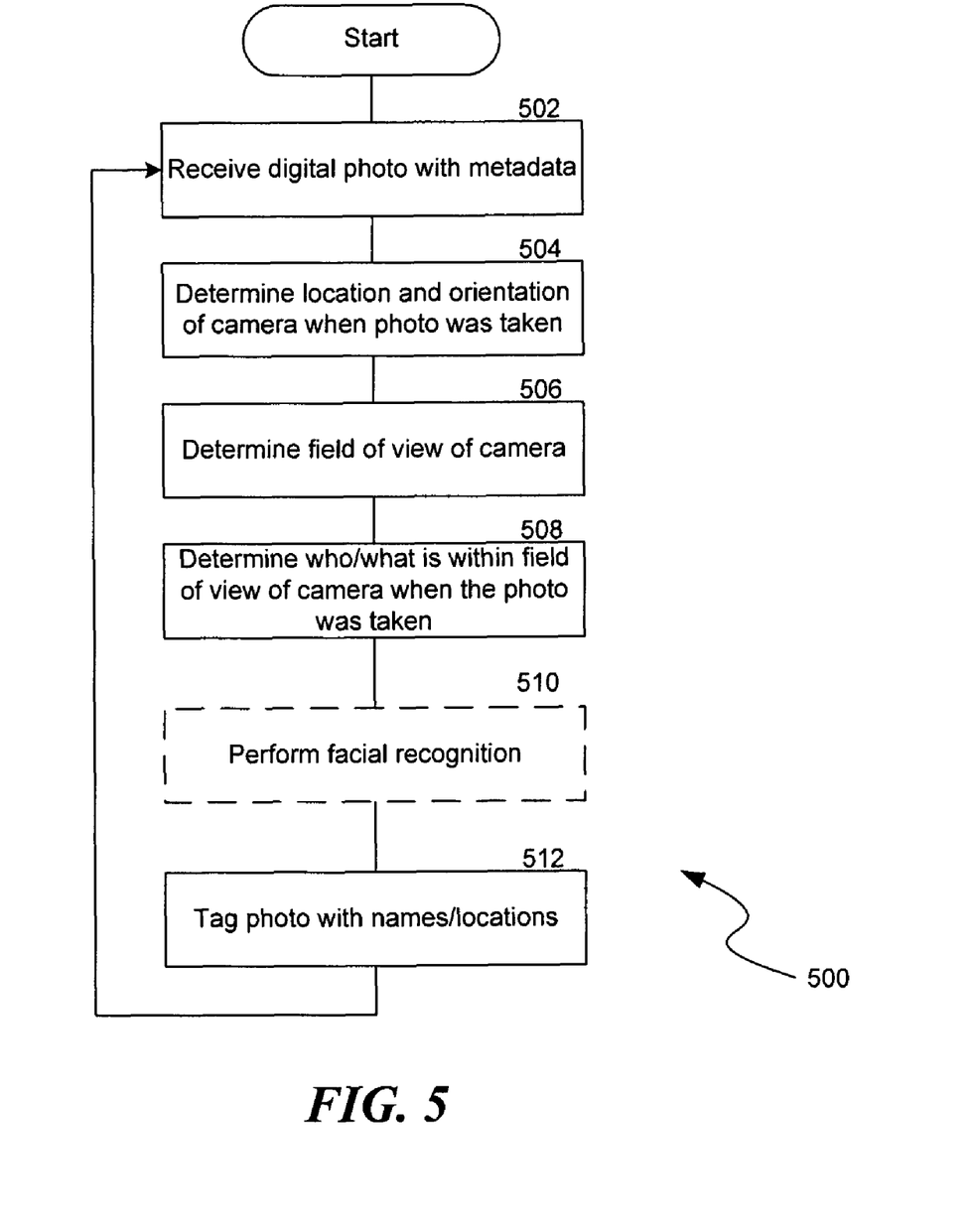
FIG. 5 is a flow diagram illustrating an example of adding metadata or tags to digital content, such as photos, where the tags relate to nearby individuals, locations, etc.

Referring to FIG. 5, an example of a routine 500 for automatically adding metadata or tags to digital photos or other digital content begins in block 502 where the server 116 receives, for example, a digital photo from the camera 102. In block 504, the server 116 determines the location and orientation of the camera when the photo was taken. For example, the photo may have attached to it metadata reflecting the latitude and longitude of the camera 102 or phone 104 when the photo was taken, where such metadata is passed to the server 116. The server 116 provides the geo-location metadata (latitude and longitude) to the location server 134 (via network 110), where the location server generates reverse geo-location data, which can correspond to map data. Such map or location data can include descriptive information regarding where the photo was taken, such as a city, neighborhood, building, address, point of interest (e.g., park, monument, etc.), store name, street intersection, and so forth.

The location server 134 provides some or all of the available location descriptive information back to the server 116 to be possibly added as tags to the photo.

Figure 6:
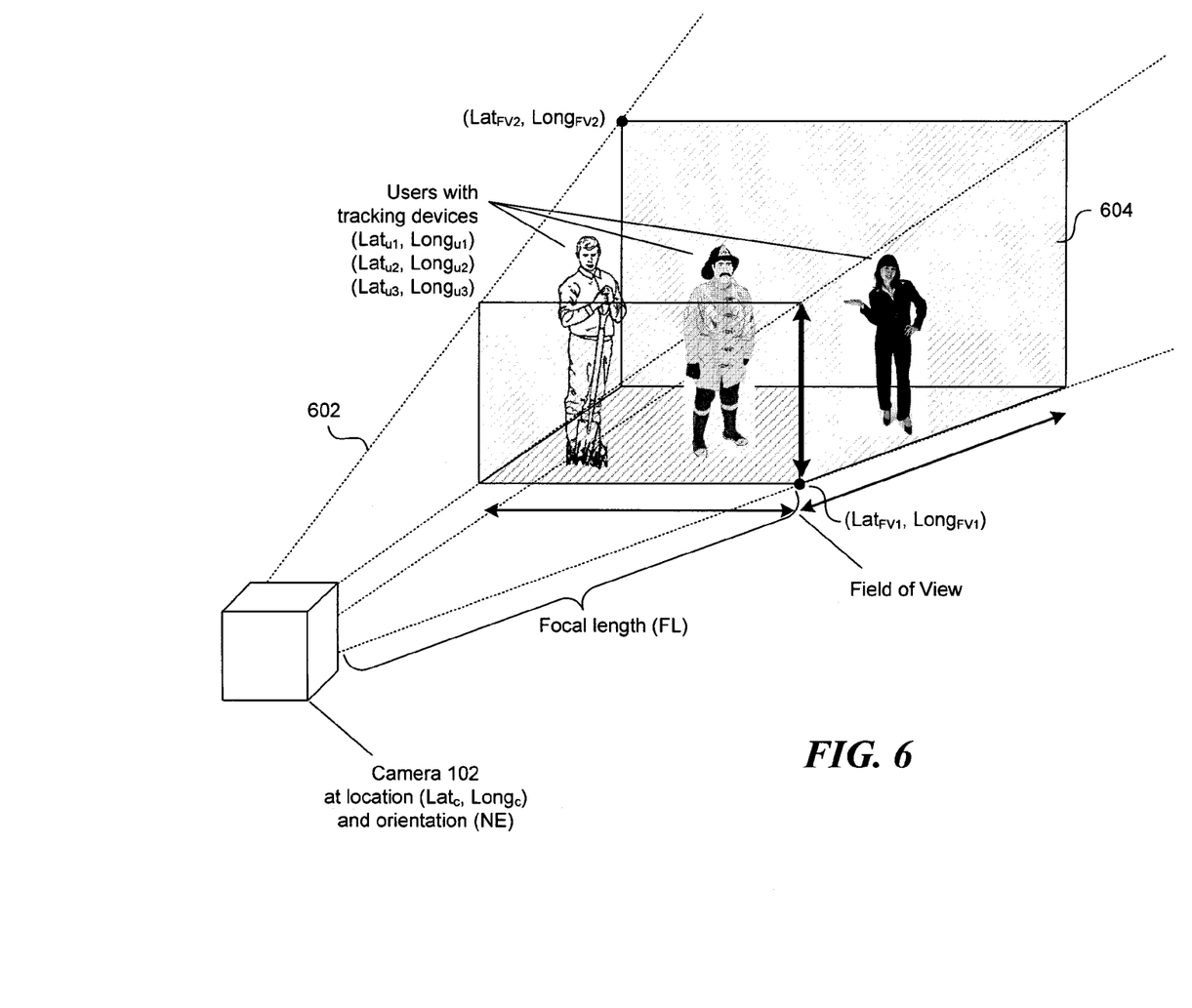
FIG. 6 is a schematic diagram illustrating a field of view for a digital camera.

Furthermore, the photo may have attached to it an orientation or digital compass reading from the camera or phone. The server 116 may then receive, and in this example, forward the orientation metadata to the location server 134, which in turn generates a vector or cone having a point or origin corresponding to the GPS location of the camera/phone, and directed out toward the direction corresponding to the orientation metadata. FIG. 6 shows an example of such a cone. The camera 102 provides metadata regarding its location ($Lat_C$, $Long_C$), which represents the latitude and longitude coordinates of its GPS location. Furthermore, the camera 102 provides its orientation, which in this example is northeast (NE). This orientation data, appended to the photo as metadata and sent via the network 110 to the server 116, permits the system to determine not only the location of the camera, but also can determine a cone 602 that represents a set of geographic coordinates within a possible field of view of the camera.

This conical field of view 602 could extend to infinity, but in reality, the camera is more likely focused on items or people much closer to the camera. Thus, under block 506, the camera's field of view or focal length metadata, attached to the photo, is passed to the server 116 (via the network 110). As shown in FIG. 6, this metadata can be a focal length (FL) for the camera, which for this example, can indicate that the camera's optical system is focused at 12 feet. Based on this, the location server 134 and/or server 116 determines a conical section or frustum representing objects that are within the focused field of view 604 of the camera. In the example of FIG. 6, this frustum can be defined by a pair of points, such as a nearby lower right point ($Lat_{FV1}$, $Long_{FV1}$), and an upper further left point ($Lat_{FV2}$, $Long_{FV2}$). These two points can define a trapezoidal frustum that represents objects in focus within the field of view of the camera.

In block 508, the location server 134 determines who or what is within the focused field of view 604 of the camera. The location server 134, using, for example, the two points noted above, determines GPS coordinates corresponding to the focused field of view 604, which defines objects or people within focus of the photo. It then determines electronic identifiers for wireless devices located at the GPS coordinates defined by the focused field of view 604.

In general, the wireless service provider or providers managing base stations or access points 112, 114 and/or 132 may determine the location of all wireless devices within the wireless networks at regular intervals. For example, the location server 134 can, at 30 second intervals, maintain a large database or table that identifies the location (latitude and longitude) of each wireless subscriber in the network. An example of a portion of the database stored in location database 136 by the location server 134 shown below as Table 1.

TABLE 1

| User Name | Wireless ID | Latitude | Longitude | Timestamp | User Electronic Address |
| --- | --- | --- | --- | --- | --- |
| User 1 | MIN 1 | Lat 1 | Long 1 | Date 1/Time 1 | E-mail address 1 |
| User 2 | IMSI 1 | Lat 2 | Long 2 | Date 1/Time 1 | E-mail address 2 |
| User 3 | IMEI 1 | Lat 3 | Long 3 | Date 1/Time 1 | E-mail address 3 |
| User 4 | MAC 1 | Lat 4 | Long 4 | Date 1/Time 1 | Electronic address 1 |
| User 5 | GUID 1 | Lat 5 | Long 5 | Date 1/Time 1 | Electronic address 2 |

In the table above, five different wireless identifiers or electronic addresses are shown as examples for five different wireless devices whose locations are tracked, although other types of electronic addresses may be used. Of course, only a single address may be used if, for example, a single wireless service provider may track its wireless devices using a common address such as IMSIs. As shown, each tracked device is at a different location, but all location coordinates correspond to the same time. Therefore, in this example, the server 116 can query the location server database 136 to determine who was at the GPS coordinates corresponding to the field of view 604, and at the time the photo was taken. As a result, the system can help to automatically determine who may be within the picture taken by the camera 102.

Under the table above, new rows are added periodically, all sorted by time (e.g. every 1-5 minutes). Alternatively or additionally, the location server 134 may create a new row for each observable change in GPS coordinates (e.g., only record a change over a given threshold, e.g. a change of more than 50 meters from the last entry for a given device). The location server can of course tune the table to reduce the number of entries. (Table 1 also includes associated user electronic addresses for use as noted below.)

In the example of FIG. 6, three users are shown, each having an associated wireless device. The locations of the wireless devices are identified with respective geographic coordinates, in this example ($Lat_{U1}$, $Long_{U1}$), ($Lat_{U2}$, $Long_{U2}$), and ($Lat_{U3}$, $Long_{U3}$). The system stores these geographic location coordinates for each of the three users in the location database 136, together with a timestamp associated with when those wireless devices were at that location, and the electronic address associated with those wireless devices, similar to Table 1.

Referring back to FIG. 5, in block 510, the system may optionally perform facial recognition to further determine, with greater accuracy, who may be in the picture. For example, the server 116 can perform facial recognition based on the three users in the above example of FIG. 6 to confirm that each is indeed in focus and in the picture. Since the facial recognition process is being done on only three individuals, the facial recognition processing can be more accurate.

The system may store in a database a representative facial map and associated name for each subscriber in the wireless service provider's network. A level of uncertainty in a facial recognition match exists and grows as the database of possible faces grows, and thus so grows the more nondeterministic the match. The system described herein can assist the process of face recognition by eliminating a majority of faces held in the database and working from a much smaller set of possible matches based on the identified electronic addresses in the focused field of view associated with a particular photo being analyzed.

Finally, in block 512, the server 116 tags the photo with the names of the users within the field of view, so that the photo now automatically has associated with it descriptive metadata. Alternatively, the server may first query the user for whether to associate those tags with a photo. For example, the server 116 may send a query to the user's mobile device 104, or send a web page or link to the user computer 124 seeking confirmation from the user to add the name tag to the photo. Alternatively or additionally, and as described below, the server may provide notification to third parties that they may be located in a photo so that they may access/download the photo, purchase a copy of the photo from an online store or web portal, purchase media containing a copy of the photo, etc.

While described generally above as associating names with a digital photo, the system can, of course, associate any data with a given photo where that data is matched with an appropriate identifier received by the system. For example, objects within the field of view may have transmitters so that the location server 134 can track or recognize them. For example, each cable car in San Francisco can have a wireless transmitter associated with it, so that if that transmitter were in the field of view when the photo was taken, and the location database 136 includes a tag "San Francisco cable car", then the server 116 can associate that tag automatically with the photo.

In another example, the user can tag photos with location data. Using reverse geographical location processing (converting latitude and longitude to a location name as noted above), an appropriate location name can be related to the photo to indicate where the photo was taken (e.g., at the "Pike Place Market," as opposed to at latitude 47.36N, longitude 122.20W). In another example, the camera may obtain the cell site ID, and pass that to the network, which responds in turn with a geographic or location name for the cell site, which can include a neighborhood, building, etc. related to the cell site.

Figure 7:
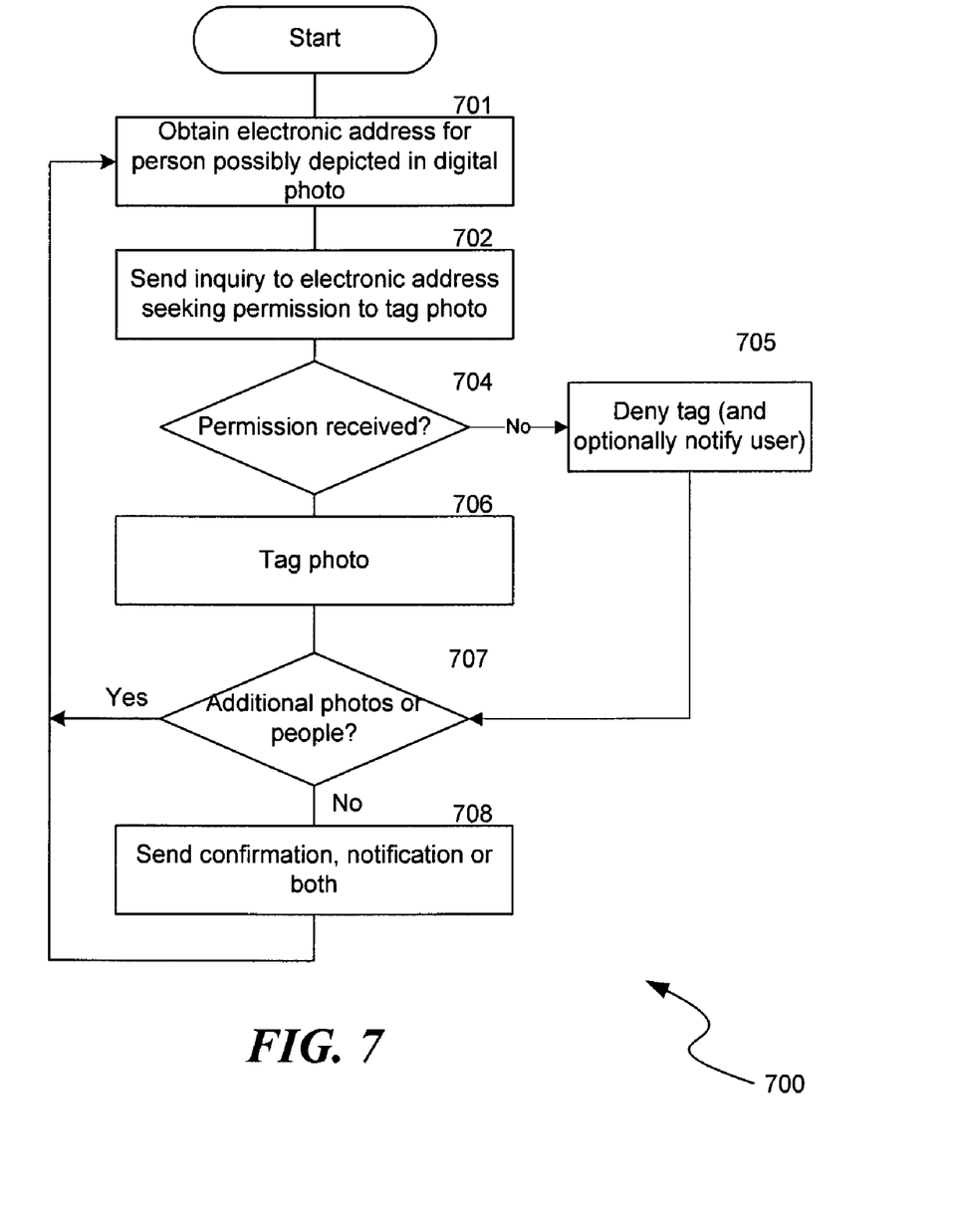
FIG. 7 is a flow chart showing an example of a process for obtaining permissions for tagging photos with personal data.

Privacy issues could arise where a photo is taken of a third party by the user, but that third party does not want his or her name associated with the photo. Referring to FIG. 7, a process 700 for obtaining permissions from third parties to tag photos begins in block 701 where the server 116 obtains an electronic address for a person possibly depicted in a digital photo. For example, the server 116 queries the location database 136 to obtain not only the identities of third parties in the focused field of view 604 for a photo (block 508 above), but also obtains a user electronic address, such as an e-mail address, instant messaging handle, SMS number, and so forth. (See right hand column of Table 1 above.)

In block 702, the server 116 sends an inquiry to the user electronic address associated with the third party depicted in the photo, asking permission to tag the photo with that third party's name. For example, the server may forward to that depicted third party an e-mail with a copy of the photo attached, and a name of the user who presumably took the picture. That user's name may be obtained from registration information associated with predefined network location noted above (e.g. http://www.T-Mobile.com/MyAlbum [user ID]), from a billing record associated with the user's phone 104, or other from information. Rather than sending the picture, the server 116 can send a link to allow the third party to access the picture through an appropriate URL.

In block 704, if the third party's permission is received (e.g. by reply email, or by clicking on an "OK" button accessed at a website), then the user's photo is automatically tagged by the server 116 in block 706. However, if permission is denied, then in block 705, no tag is associated with the photo, and the system may optionally notify the user of such denial via known means (e.g., an e-mail, SMS, etc.).

In block 707, the server determines whether any additional photos are to be processed or whether other people are in the current photo. For example, in the example of FIG. 6, three third party users are shown, and thus three separate permissions may be sent by the server under block 702. Alternatively or additionally, the user may have an entire album or batch of photos to be processed, and thus the server may act on such set of photos to attempt to obtain permissions to associate tags with each photo in the album or set. Following block 707, if no additional photos or people are to be processed or queried, then the server 116 in block 708 sends a confirmation to the user that all photos have been processed and any metadata for which permissions have been obtained have been automatically added to the photos.

Alternatively or additionally, the server 116 in block 708 may ask for the user's confirmation before adding any suggested tags to the photo. Furthermore, the server may send an electronic communication (e.g. email, SMS, MMS, IM, etc.) to the third party and provide him or her with an opportunity to download the photo, purchase copies of the photo, purchase media having copies of the photo on it, etc. In this way, third parties may have access to more photos of themselves since most pictures a person takes is of other people. The server 116, or user, may permit the third party to access only individual photos, or albums of photos.

Overall, various options are possible. While process described above employ the server 116 and location server 134, each with separate databases, a single server and single database may be employed, or three or more servers/databases. The processes described above may present queries to the user or third parties on their mobile phones, at the user computer 124, etc. Further, once tags are associated with the digital content, they may be stored together on any mobile phone, in the database 118, on the user computer 124, etc While digital photos are generally described herein in the examples, the processes apply equally to any other digital content, such as digital videos or digital audio content. With digital audio, stereo microphones and digital signal processing may be used to help determine a audio field of capture range representing a distance from the microphones where dominate sounds in the audio recording are located. Overall, the digital content capture device records as metadata a geographic field of capture range, which, together with a timestamp, geographic location/orientation determine a geographic range in which to identify third party wireless devices, similar to the focused field of view 604 in FIG. 6.

Conclusion

As described above, a system gathers data or metadata associated with a photo to identify a reduced set of individuals who, or objects that, may be in a photo, and then performs facial recognition based on the reduced set to create a tag that identifies who or what is most likely captured in the photo. A digital camera, camera-phone, video camera or other image capture device (camera) includes or receive data from a clock, digital compass, GPS receiver, optics system or other components. The clock, which could be a clock signal provided by a wireless network, indicates when the photo was taken. The digital compass indicates the direction of the camera's field of view. The GPS receiver indicates the geographic location of where the photo was taken. The optics system indicates the focal length setting for the camera. Using all of this information, the camera, or a network server that receives the photo and this information, can identify the geographic location for the camera's field of view. If the network tracks the location of all individuals or certain objects, e.g. from GPS signals from subscriber phones, the system can create a log of where everyone is at any given point in time. Then, from the determined field of view and time of day when the photo was taken, and the log of where everyone is when the photo was taken, the system can identify the reduced set of individual who are likely in the photo.

The system may also perform facial recognition to compare that set of individuals to the faces in the photo to find any matches. The network may then send those matched individuals an email or other communication to get their permissions before the photo is tagged with their names. Overall, facial recognition moves from identifying one photographed person from 6 billion humans, to maybe 1 in 50 million (for all Facebook and similar social networks), down to about 1 in 20. Furthermore, the system allows an individual to get photos of themselves, since often most photos in that individual's camera are of other people, but if everyone shared photos and tagged them efficiently with who is in the photo, the individual could get those other photos more conveniently.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while aspects of the invention are described above with respect to capturing and routing digital images, any other digital content may likewise be managed or handled by the system provided herein, including video files, audio files, and so forth. While processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

While certain aspects of the invention are presented below in certain claim forms, the applicant contemplates the various aspects of the invention in any number of claim forms. For example, while only one aspect of the invention is recited as a means-plus-function claim under 35 U.S.C. §112, sixth paragraph, other aspects may likewise be embodied as a means-plus-function claim, or in other forms, such as being embodied in a computer-readable medium. (Any claims intended to be treated under 35 U.S.C. §112, ¶6 will begin with the words "means for.") Accordingly, the applicant reserves the right to add additional claims after filing the application to pursue such additional claim forms for other aspects of the invention.

We claim:

1. A computer system, for use in a wireless telecommunications network, to associate metadata tags with digital photos taken by a digital camera, camera phone, or camcorder, the computer system comprising:
   a server computer in communication with the wireless telecommunications network;
   a database, coupled to the server computer,
      wherein the database includes a table that identifies locations of wireless devices within the wireless telecommunications network at certain points in time and user names associated with the wireless devices, and
      wherein the database stores facial image data for users of the wireless devices;
   wherein the server computer is configured to:
      receive a digital photo with associated metadata, wherein the metadata associated with the digital photo includes:
         a geographic location associated with where the digital photo was taken,
         a timestamp associated with when the digital photo was taken,
         a direction associated with a direction toward or from the geographic location where the digital photo was taken, and
         a focal length setting of the digital camera, camera phone, or camcorder that took the digital photo;
      determine a geographic focus field of view for the digital camera, camera phone, or camcorder that took the digital photo, wherein the server determines the geographic focus field of view based at least in part on the geographic location, timestamp, direction, and setting metadata;
      identify at least one wireless device within the geographic focus field of view based at least in part on a query of the database to identify that the one wireless device is at a geographic location that is within the geographic focus field of view at a point in time corresponding to the timestamp associated with the digital photo;
      obtain a user name associated with the at least one wireless device from a query of the database;
      perform facial recognition operations on the digital photo to determine an identity of at least one person depicted in the digital photo based in part on the stored facial image data and the user name associated with the at least one wireless device;
      automatically forward a link, for accessing the digital photo, to an electronic address associated with the user name and request permission to add as a metadata tag the obtained name to the digital photo; and,
      conditionally add as the metadata tag the obtained name to the captured digital content based at least in part on an electronic communication received granting permission.

2. The system of claim 1 further comprising a displayable query as a web page or display screen of data for a user who submitted the digital photo to confirm with the user to add the metadata tag to the digital photo.

3. A method of associating metadata tags with digital content captured by a digital content capture device, the method comprising:
   receiving captured digital content with associated metadata, wherein the metadata associated with the captured digital content includes:
      a geographic location associated with where the digital content was captured, wherein the digital content capture device is configured to enter a standby state after the digital content capture device is switched-off to obtain an accurate geographic location,
      a timestamp associated with when the digital content was captured,
      a direction associated with a direction toward or from the geographic location where the digital content was captured, and,
      a setting of the digital content capture device;
   automatically determining a geographic field of capture range for the digital content capture device based at least in part on the geographic location, timestamp, direction, and setting metadata;
   automatically identifying at least one wireless device within the geographic field of capture range;
   automatically obtaining a user name associated with the at least one wireless device from a query of a database for a digital identifier associated with the at least one wireless device, wherein the database stores at least a list of digital identifiers associated with respective user names; and,
   automatically forwarding a link, for accessing the digital content, to an electronic address associated with the user name and requesting permission to add as a metadata tag the obtained name to the captured digital content; and,
   conditionally adding as the metadata tag the obtained name to the captured digital content based at least in part on an electronic communication received granting permission.

4. The method of claim 3 wherein the digital content capture device is a digital camera, wherein the digital content is a digital photo, and wherein the method further comprises providing a display to a user regarding whether to add the metadata tag of the obtained name to the captured digital content.

5. The method of claim 3, further comprising:
   automatically forwarding the digital content, or link to the digital content, to an electronic address associated with the user name and requesting permission to add as the metadata tag the obtained name to the captured digital content; and,
   only adding as the metadata tag the obtained name to the captured digital content if an electronic communication is received granting permission.

6. The method of claim 3 wherein the geographic location is a pair of latitude and longitude coordinates, the direction is a digital compass reading, and the setting is at least a focal length setting of an optical system.

7. The method of claim 3, further comprising synchronizing a clock in the digital content capture device based on a clock associated with a wireless telecommunications network.

8. The method of claim 3 wherein the digital content comprises an audio file.

9. The method of claim 3 wherein automatically identifying at least one wireless device within the geographic field of capture range includes querying a database that records the location of wireless devices over time, wherein the wireless devices move within a wireless telecommunications network.

10. The method of claim 3, further comprising receiving from multiple wireless devices an uploaded table of location coordinates over time, wherein the location coordinates provide periodic or sporadic location data for each of the multiple wireless devices.

11. An article of manufacture, wherein the article of manufacture comprises a tangible computer-readable medium carrying instructions for use by a data processing device, wherein the instructions, when executed by the data processing device permit the device to perform a method, the method comprising:
   automatically determining a geographic field of capture range for a received unit of digital content, wherein the determining is based at least in part on:
      geographic location metadata associated with where the received unit of digital content was captured,
      timestamp metadata associated with when the received unit of digital content was captured, and,
      direction or depth of field metadata associated with capture of the received unit of digital content;
   automatically identifying at least one wireless device or wireless transmitter within the geographic field of capture range;
   automatically obtaining or identifying a user name associated with the at least one wireless device or wireless transmitter from a query of a database for an identifier associated with the at least one wireless device or wireless transmitter,
      wherein the database stores at least a list of identifiers associated with respective user names or location/object names,
   performing facial recognition operations on the captured digital content based at least in part on the user name associated with the at least one wireless device or wireless transceiver;
   automatically forwarding a link, for accessing the digital content, to an electronic address associated with the user name and requesting permission to add as a metadata tag the obtained name to the captured digital content; and,
   conditionally adding as the metadata tag the obtained name to the captured digital content based at least in part on an electronic communication received granting permission.

12. The article of manufacture of claim 11, further comprising:
   automatically requesting from a user associated with a device that captured the digital content permission to add as the metadata tag the user name to the captured digital content; and,
   only adding as the metadata tag the user name to the captured digital content if permission is received.

13. An apparatus configured for processing digital content, the apparatus comprising:
   means for capturing digital content, wherein the means for capturing digital content is further configured to provide data representing a digital content capture range associated with each item of captured digital content;
   means for automatically determining location data for each item of captured digital content,
      wherein the location data includes geographic coordinate data and orientation data;
   a clock for use in generating timestamps associated with each item of captured digital content;
   memory for at least temporarily storing digital content;
   communication means for transferring each item of captured digital content with its associated range data, determined location data, and associated timestamp;
   a processor coupled among the means for capturing digital content, the means for automatically determining location data, the clock, the memory, and the communication means;
   means for determining a geographic field of capture based at least on the geographic coordinate data and the orientation data;
   means for identifying at least one wireless device within the geographic field of capture;
   means for obtaining a user name and electronic address associated with the at least one wireless device from a query of a database that stores user names and electronic addresses associated wireless devices;
   means for automatically forwarding a link, for accessing the digital content, to the electronic address associated with the user name associated with the at least one wireless device and requesting permission to add as a metadata tag the obtained name to the captured digital content; and,
   means for conditionally adding as the metadata tag the obtained name to the captured digital content based at least in part on an electronic communication received granting permission.

14. The apparatus of claim 13, further comprising:
   means for querying a user associated with the means for capturing digital content whether to associate metadata tags with the digital content; and,
   means for associating the tags with the digital content based on received user input.

15. The apparatus of claim 13 wherein the memory stores a table of periodic or sporadic location data, and wherein the communications means uploads the table of periodic or sporadic location data to a network server upon being connected with the network server.

16. The apparatus of claim 13 wherein the clock is synchronized when the apparatus is connected with a network clock.

17. A method of processing still digital images, moving digital images, or both, the method comprising:
   receiving digital images representing captured still or moving digital images;
   receiving a timestamp associated with the captured still or moving digital images, and location data associated with the captured still or moving digital images;
   based at least in part on the location data and timestamp, automatically determining that a third party wireless device is located near to where and when the still or moving digital images were captured;
   performing facial recognition operations on the captured still or moving digital images based in part on data associated with the third party wireless device;

automatically determining a data tag for associating with the captured still or moving digital images, wherein the tag relates to a person's name;

automatically obtaining an electronic address associated with the person;

automatically providing to the person, via the electronic address, a link for accessing the captured still or moving digital images and a permission query regarding whether to logically associate the tag with the captured still or moving digital images; and, conditionally adding the metadata tag to the captured still or moving digital images based at least in part on an electronic communication received granting permission.

18. The method of claim 17 wherein the location data is GPS or GIS data, wherein receiving digital images comprises:

storing on a remote database the captured still or moving digital images, and displaying a representation of the captured still or moving digital images on a user computer via a web page.

19. The system of claim 1, further comprising sending with the link an identity of a person associated with the digital camera, camera phone, or camcorder that took the digital photo.

20. The system of claim 1, further comprising offering the user associated with the electronic address an opportunity to purchase a copy of the digital photo or purchase media having a copy of the photo on it.

21. The method of claim 17, further comprising sending with the link a name of a person associated with the digital content capture device that captured the digital content.

22. The method of claim 17, further comprising offering the user associated with the electronic address an opportunity to purchase a copy of the digital content or purchase media having a copy of the digital content on it.

* * * * *